(12) United States Patent
Yoshida et al.

(10) Patent No.: US 7,111,456 B2
(45) Date of Patent: Sep. 26, 2006

(54) EXHAUST EMISSION CONTROL APPARATUS FOR INTERNAL COMBUSTION ENGINE

(75) Inventors: Kohei Yoshida, Sosono (JP); Shinichi Takeshima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 10/724,154

(22) Filed: Dec. 1, 2003

(65) Prior Publication Data

US 2004/0107694 A1    Jun. 10, 2004

(30) Foreign Application Priority Data

Dec. 10, 2002    (JP)    ............... 2002-358555

(51) Int. Cl.
*F01N 3/10*    (2006.01)
(52) U.S. Cl. ............... 60/301; 60/274; 60/286; 60/295; 60/297
(58) Field of Classification Search .............. 60/274, 60/285, 286, 295, 297, 301
See application file for complete search history.

(56) References Cited

U.S. PATENT DOCUMENTS 5,974,788 A * 11/1999 Hepburn et al. ............... 60/274
5,974,791 A * 11/1999 Hirota et al. .................. 60/276
6,173,571 B1 * 1/2001 Kaneko et al. ................ 60/286
6,233,925 B1 * 5/2001 Hirota et al. .................. 60/285
6,269,634 B1 * 8/2001 Yokota et al. ................. 60/286
6,367,246 B1 * 4/2002 Hirota et al. .................. 60/295
6,502,391 B1 * 1/2003 Hirota et al. .................. 60/288

FOREIGN PATENT DOCUMENTS

| EP | 0 862 941 A2 | 9/1998 |
|----|----|----|
| EP | 0 892 158 A2 | 1/1999 |
| EP | 1 108 876 A2 | 6/2001 |
| JP | A 8-200049 | 8/1996 |
| JP | A 9-53442 | 2/1997 |
| JP | B2 2722987 | 11/1997 |
| JP | A 2000-240428 | 9/2000 |
| JP | A 2001-303980 | 10/2001 |
| JP | A 2003-65042 | 3/2003 |

* cited by examiner

*Primary Examiner*—Binh Q. Tran
(74) *Attorney, Agent, or Firm*—Oliff & Berridge, PLC

(57) ABSTRACT

In an exhaust emission control apparatus having an NOx catalyst disposed on an exhaust passage of an internal combustion engine, the present invention is intended to suppress deterioration in exhaust emissions when the temperature of the NOx catalyst is raised. In case where the temperature of the NOx catalyst need be raised, an amount of nitrogen oxides occluded in the NOx catalyst is decreased in advance to the raising of the temperature of the NOx catalyst, whereby the amount of nitrogen oxides to be discharged from the NOx catalyst upon raising the temperature of the NOx catalyst can be decreased.

17 Claims, 9 Drawing Sheets

EXHAUST EMISSION CONTROL APPARATUS FOR INTERNAL COMBUSTION ENGINE

BACKGROUND OF THE INVENTION

1. Field of the Invention

The present invention relates to a technology for controlling or purifying exhaust emissions of an internal combustion engine, and more particularly to an exhaust emission control apparatus including a particulate filter and an NOx occlusive agent.

2. Description of the Related Art

In recent years, it is desired that an internal combustion engine installed on a motor vehicle or the like should reduce the amounts of particulate matter (PM), nitrogen oxides (NOx), etc., discharged into the atmosphere.

To such a demand, in the past, for example, there has been proposed a technology that there are disposed in an exhaust passage of an internal combustion engine a particulate filter for collecting PM in an exhaust and an NOx catalyst adapted to collect NOx in the exhaust when the oxygen concentration of the exhaust flowing into the NOx catalyst is high and to discharge the NOx collected therein so as to be reduced when the oxygen concentration of the exhaust flowing into the NOx catalyst is low (for example, see a first patent document: Japanese patent No. 2722987, a second patent document: Japanese patent application laid-open No. 2001-303980, a third patent document: Japanese patent application laid-open No. H09-53442, and a fourth patent document: Japanese patent application laid-open No. H08-200049, and a fifth patent document: Japanese patent application laid-open No. 2000-240428).

Since there is a limit to the amount of PM that can be collected by a particulate filter, it is necessary to properly remove the PM collected by the particulate filter thereby to recover the PM collection capability of the particulate filter.

As a method of removing the PM collected by the particulate filter, it is general to combust the PM collected by the particulate filter by raising the temperature of the particulate filter.

When the temperature of the particulate filter is raised in the exhaust emission control apparatus including the particulate filter and the NOx catalyst, however, not only the temperature of the particulate filter but also the temperature of the NOx catalyst might rise in some cases. As a result, there might be the case that the NOx occluded in the NOx catalyst is discharged into the atmosphere without being purified.

In addition, the NOx catalyst occludes not only the NOx contained in the exhaust but also sulfur oxides (SOx) therein, so when the amount of occlusion of the sulfur oxides increases, there takes place so-called sulfur oxide poisoning in which the NOx occlusion capability of the NOx catalyst is reduces.

As a method of removing the sulfur oxide poisoning of the NOx catalyst, it is general to reduce SOx to sulfur dioxide ($SO_2$) while thermally decomposing the sulfur oxides from the NOx catalyst by raising the temperature of the NOx catalyst. However, when the temperature of the NOx catalyst is raised so as to remove the sulfur oxide poisoning, the NOx occluded in the NOx catalyst might sometimes be discharged into the atmospheric without being purified.

SUMMARY OF THE INVENTION

The present invention has been made in view of the above-mentioned problems, and has its object to provide a technology which is capable of suppressing, in an exhaust emission control apparatus for an internal combustion engine including an NOx catalyst, deterioration in exhaust emissions when the temperature of the NOx catalyst is raised.

To solve the above-mentioned problems, the present invention adopted the following solution. That is, an exhaust emission control apparatus for an internal combustion engine with an NOx catalyst disposed on an exhaust passage is primarily characterized in that when the temperature of the NOx catalyst need be raised, the amount of nitrogen oxides occluded in the NOx catalyst is decreased in advance to the raising of the temperature of the NOx catalyst.

Preferably, the NOx catalyst operates to occlude the nitrogen oxides in an exhaust when the air fuel ratio of the exhaust flowing into the NOx catalyst is lean, and discharge and reduce the occluded nitrogen oxides when the oxygen concentration of the exhaust flowing into the NOx catalyst is reduced.

In cases where poisoning of the NOx catalyst due to sulfur oxides (SOx) is eliminated, or where particulate matter is removed from a particulate filter included in the NOx catalyst (including a construction having an NOx occlusive agent carried on the particulate filter, another construction having an NOx catalyst and a particulate filter disposed in series with each other on an exhaust passage of the internal combustion engine, etc.), the temperature of the NOx catalyst as stated above may sometimes be raised to even a relatively high temperature range (for example, about 500° C.–700° C.)

If the temperature of the NOx catalyst is raised to such a high temperature range as stated above, a part of the nitrogen oxides occluded in the NOx catalyst might be discharged without being reduced even under the situation where the oxygen concentration of the exhaust is high.

The reasons for the nitrogen oxides being discharged from the NOx catalyst when the temperature of the NOx catalyst is raised are generally considered to be the following.

For example, the nitrogen oxides chemically adsorbed by the NOx catalyst among those occluded in the NOx catalyst are thermally decomposed and discharged from the NOx catalyst by raising the temperature thereof, or the nitrogen oxides physically adsorbed by the NOx catalyst are vaporized and discharged from the NOx catalyst by raising the temperature thereof.

If the nitrogen oxides occluded in the NOx catalyst are discharged without being reduced in this manner due to the temperature rise of the NOx catalyst, there arises a problem that the exhaust emissions of the internal combustion engine are deteriorated.

In contrast to this, the exhaust emission control apparatus for an internal combustion engine according to the present invention decreases the amount of nitrogen oxides occluded in the NOx catalyst before the temperature of the NOx catalyst is raised.

If the amount of nitrogen oxides occluded in the NOx catalyst is decreased before the temperature rise of the NOx catalyst, the amount of nitrogen oxides discharged from the NOx catalyst upon the temperature of the NOx catalyst being raised will decrease, thus resulting in that the exhaust emissions of the internal combustion engine do not deteriorate easily.

Here, note that a method of supplying a reducing agent such as fuel to the NOx catalyst before the temperature of the NOx catalyst is raised can be exemplified as a method of decreasing the amount of nitrogen oxides occluded in the NOx catalyst.

In addition, even if the temperature of the NOx catalyst is not raised (hereinafter called "in ordinary time"), there is a case where a reducing agent is supplied to the NOx catalyst so as to discharge and reduce the nitrogen oxides occluded in the NOx catalyst. In this case, the reducing agent may be supplied at an amount more than that in ordinary time before the temperature of the NOx catalyst is raised.

In such a case, preferably, an exhaust emission control apparatus for an internal combustion engine according to the present invention includes: a first reducing agent supplying section for supplying a reducing agent to an NOx catalyst when an amount of nitrogen oxides occluded in the NOx catalyst becomes more than or equal to a predetermined amount; and a second reducing agent supplying section for supplying an amount of reducing agent more than that supplied by the first reducing agent supplying section to the NOx catalyst before the temperature of the NOx catalyst is raised.

When the second reducing agent supplying section supplies the reducing agent to the NOx catalyst at an amount more than that supplied by the first reducing agent supplying section before the temperature of the NOx catalyst is raised, the amount of nitrogen oxides reduced and purified by the NOx catalyst before the temperature of the NOx catalyst is raised increases, as a consequence of which the amount of nitrogen oxides discharged from the NOx catalyst when the temperature of the NOx catalyst is raised can be further decreased.

Preferably, the second reducing agent supplying section may increase the amount of reducing agent to be supplied in accordance with the increasing amount of nitrogen oxides occluded in the NOx catalyst at the time when it becomes necessary to raise the temperature of the NOx catalyst. In this case, the nitrogen oxides discharged from the NOx catalyst when the temperature of the NOx catalyst is raised can be decreased in a reliable manner.

The following methods are exemplified as a method of supplying a reducing agent (fuel) to the NOx catalyst. That is, sub-injection such as VIGOM injection, POST injection, etc., from a fuel injection valve of the internal combustion engine may be made on the intake stroke, the expansion stroke or the exhaust stroke, etc. Alternatively, a reducing agent may be added to the exhaust from a reducing agent addition valve, which is disposed on the exhaust passage of the internal combustion engine.

In this connection, the first reducing agent supplying section and the second reducing agent supplying section according to the present invention may be achieved by switching between amounts of fuel to be injected as sub-injection from the fuel injection valve, or by switching between amounts of reducing agent to be added from the reducing agent addition valve. Alternatively, one of the first and second reducing agent supplying sections is achieved by injecting fuel from the fuel injection valve as sub-injection, and the other thereof may be achieved by adding a reducing agent from the reducing agent addition valve.

Further, according to the present invention, preferably, an estimating section may estimate the amount of nitrogen oxides occluded in the NOx catalyst, so that when the amount of nitrogen oxides estimated by the estimating section is less than a predetermined amount, the amount of nitrogen oxides occluded in the NOx catalyst is not decreased.

Thus, when the amount of nitrogen oxides occluded in the NOx catalyst is limited, the amount of nitrogen oxides occluded in the NOx catalyst is not decreased before the temperature of the NOx catalyst is raised. As a result, it is possible to harmonize the prevention of deterioration in the exhaust emissions and the reduction of fuel consumption with each other.

Furthermore, in order to achieve the purpose of decreasing the amount of nitrogen oxides discharged from the NOx catalyst when the temperature of the NOx catalyst is raised, the raising of the temperature of the NOx catalyst may be permitted only when the amount of nitrogen oxides occluded in the NOx catalyst is limited, e.g., at the time when the amount of nitrogen oxides occluded in the NOx catalyst is less than a predetermined amount.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Figure 1:
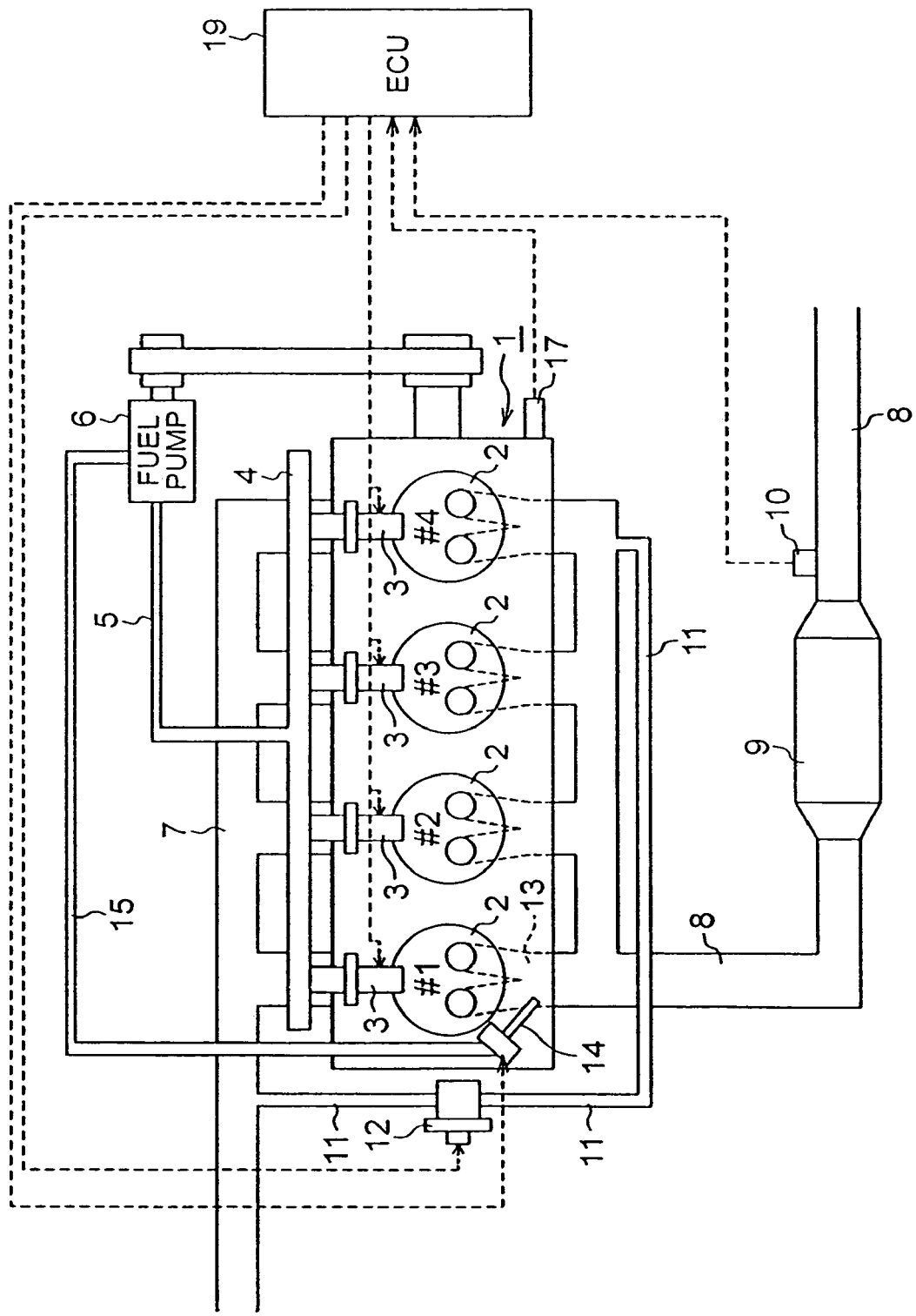
FIG. 1 is a view showing the schematic construction of an internal combustion engine to which the present invention is applied.
Figure 2:
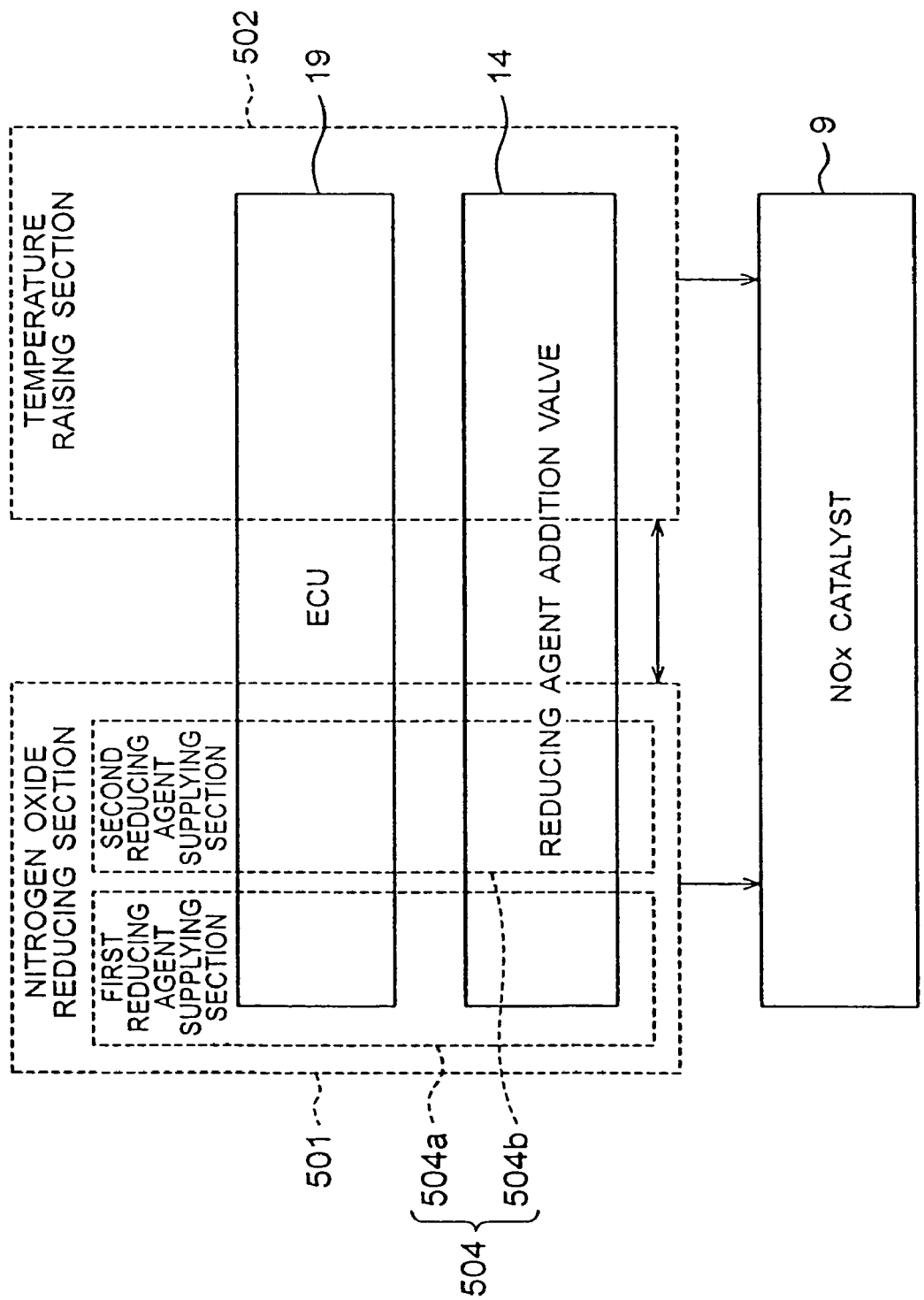
FIG. 2 is a block diagram showing an exhaust emission control apparatus for an internal combustion engine according to an embodiment of the present invention.

FIG. 1 is a view that shows the schematic construction of an internal combustion engine to which the present invention is applied, and FIG. 2 is a block diagram that shows an exhaust emission control apparatus for an internal combustion engine according to an embodiment of the present invention.

The internal combustion engine, which is shown in FIG. 1 and generally designated at reference numeral 1, is an internal combustion engine of compression ignition type (diesel engine) including four cylinders 2.

A plurality of fuel injection valves 3 are mounted on the cylinders 2, respectively, of the internal combustion engine 1 for directly injecting fuel into the corresponding cylinders 2. The fuel injection valves 3 are in communication with a fuel pump 6 through a common rail chamber 4 and a fuel supply tube 5.

An intake passage 7 and an exhaust passage 8 are connected with the internal combustion engine 1 with an NOx catalyst 9 being disposed on the exhaust passage 8. Specifically, the NOx catalyst 9 may be constructed as follows. That is, one example comprises a particulate filter having an NOx occlusive agent and a precious metal catalyst (e.g., platinum (Pt), etc.) carried thereon. Another example comprises an NOx catalyst of occlusion and reduction type including a combination of an NOx occlusive agent and a precious metal catalyst, and a particulate filter arranged in series with the occlusion and reduction type NOx catalyst. In this case, either one of the occlusion and reduction type NOx catalyst and the particulate filter may be arranged at a location upstream of the other.

An oxygen concentration sensor 10 is mounted on the exhaust passage 8 at a location downstream of the NOx catalyst 9 for generating an electric signal corresponding to the oxygen concentration of the exhaust discharged from the cylinders 2 into the exhaust passage 8.

In addition, a reducing agent addition valve 14 is mounted on an exhaust port 13 of one of the four cylinders 2 of the internal combustion engine 1, and is in communication with the fuel pump 6 through a fuel supply tube 15.

An electronic control unit (ECU) 19 is provided together with the internal combustion engine 1 as constructed in this manner. The ECU 19 comprises an arithmetic logic operational circuit including a CPU, a ROM, a RAM, a backup RAM, etc.

The above-mentioned oxygen concentration sensor 10 and a crank position sensor 17, which is mounted on the internal combustion engine 1 for sensing the rotational angle or crank position of the crankshaft of the internal combustion engine 1 to generate a corresponding electrical output signal, are electrically connected to the ECU 19.

Further, the fuel injection valves 3, an exhaust gas recirculation (EGR) valve 12 and the reducing agent addition valve 14 are electrically connected to the ECU 19 so that the ECU 19 can control the fuel injection valves 3, the exhaust gas recirculation valve 12 and the reducing agent addition valve 14 in an appropriate manner.

For example, the ECU 19 executes arithmetic calculations of inputs of output signals from a variety of kinds of sensors, as well as arithmetic calculations of the engine rotational speed, the amount of fuel injected, the fuel injection timing, etc., in a basic routine to be executed at regular intervals. The various kinds of signals input to the ECU 19 and various control values obtained by the calculations of the ECU 19 in the basic routine are temporarily stored in the RAM of the ECU 19.

The ECU 19 performs interrupt processing with signal inputs from the variety of sensors, switches, the elapse of a predetermined time, a signal input from the crank position sensor 17, etc., being made as a trigger. In such interrupt processing, the ECU 19 reads out various control values from the RAM, and controls the fuel injection valve 3 in accordance with the control values thus read out.

Moreover, the ECU 19 executes, as interrupt processing based on the crank position sensor 17 or interrupt processing at regular intervals, rich spike control or temperature raising control as described below.

Figure 3:
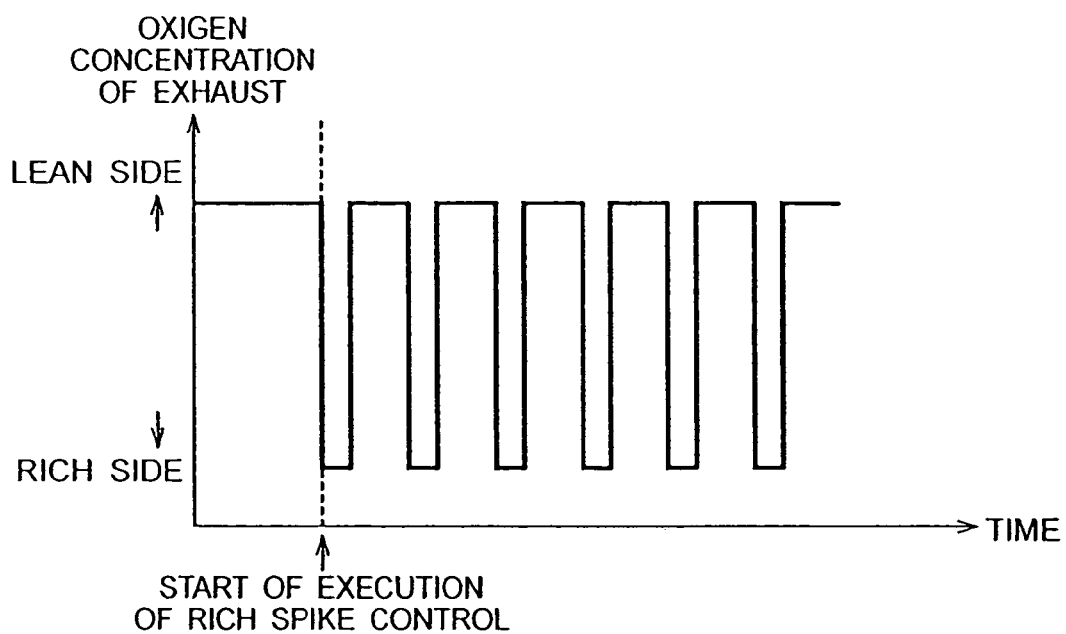
FIG. 3 is a view showing the behavior of the oxygen concentration of an exhaust at the time when rich spike control is executed.

In the rich spike control, when a rich spike control execution condition holds, the ECU 19 intermittently supplies a reducing agent in the form of fuel to the exhaust at a location upstream of the NOx catalyst 9, so that the oxygen concentration of the exhaust flowing into the NOx catalyst 9 is controlled to alternately provide a rich atmosphere and a lean atmosphere in a repeated manner, as shown in FIG. 3.

Here, the following conditions are exemplified as the rich spike control execution condition. That is, (1) the operation time of the internal combustion engine 1 from the end of execution of the last rich spike control (preferably, the time duration for which the internal combustion engine 1 has been operated at a lean air fuel ratio) is longer than or equal to a predetermined time; (2) the integrated or accumulated value of the amount of fuel injected from the end of execution of the last rich spike control is more than or equal to a predetermined value; and (3) the integrated or accumulated value of the amount of intake air supplied to the engine from the end of execution of the last rich spike control is more than or equal to a predetermined value.

For example, the following methods are exemplified as a method of supplying a reducing agent in the form of fuel to the exhaust at a location upstream of the NOx catalyst 9. That is, sub-injection such as VIGOM injection, PILOT injection, etc., from each fuel injection valve 3 is carried out, or fuel is intermittently added to the exhaust from the reducing agent addition valve 14. In this embodiment, the following description will be made by referring to a method of intermittently adding fuel to the exhaust from the reducing agent addition valve 14, which constitutes a reducing agent supplying section 504 in FIG. 2.

When the above-mentioned rich spike control is executed by a nitrogen oxide reducing section 501, the exhaust flowing into the NOx catalyst 9 comprises a gas of a low oxygen concentration containing a reducing agent in the form of fuel. When such an exhaust flows into the NOx catalyst 9, the nitrogen oxides (NOx) occluded in the NOx catalyst 9 are discharged therefrom and react with the fuel in the exhaust so as to be reduced to nitrogen ($N_2$). As a result, the amount of the NOx occluded in the NOx catalyst 9 is decreased, whereby the NOx occlusion capability of the NOx catalyst is recovered. Here, note that the nitrogen oxide reducing section 501 in this embodiment is constituted by the ECU 19 adapted to execute the rich spike control, and the reducing agent addition valve 14, as shown in FIG. 2.

Moreover, in the temperature raising control, when a temperature raising control execution condition holds, the ECU 19 operates to add fuel to the exhaust from the reducing agent addition valve 14 so as to oxidize the fuel in the NOx catalyst 9, whereby the temperature of the NOx catalyst 9 is raised by using the heat generated upon oxidization of the fuel.

For example, the following conditions are exemplified as the temperature raising control execution condition. That is, (1) the amount of sulfur oxides (SOx) occluded in the NOx occlusive agent, which constitutes the NOx catalyst 9, is more than or equal to a predetermined amount; and (2) the amount of particulate matter (PM) collected by the particulate filter, which constitutes the NOx catalyst 9, is more than or equal to a predetermined amount.

When the above-mentioned temperature raising control is executed by a temperature raising section 502, the sulfur oxides (SOx) occluded in the NOx occlusive agent are thermally decomposed from the NOx occlusive agent to react with reducing components such as hydrocarbons (HCs), carbon monoxide (CO), etc., contained in the exhaust to be reduced to sulfur dioxide ($SO_2$) and the like, or the PM collected in the particulate filter are combusted and removed. Here, note that the temperature raising section 502 in this embodiment is constituted by the ECU 19 and the reducing agent addition valve 14, as shown in FIG. 2.

Figure 4:
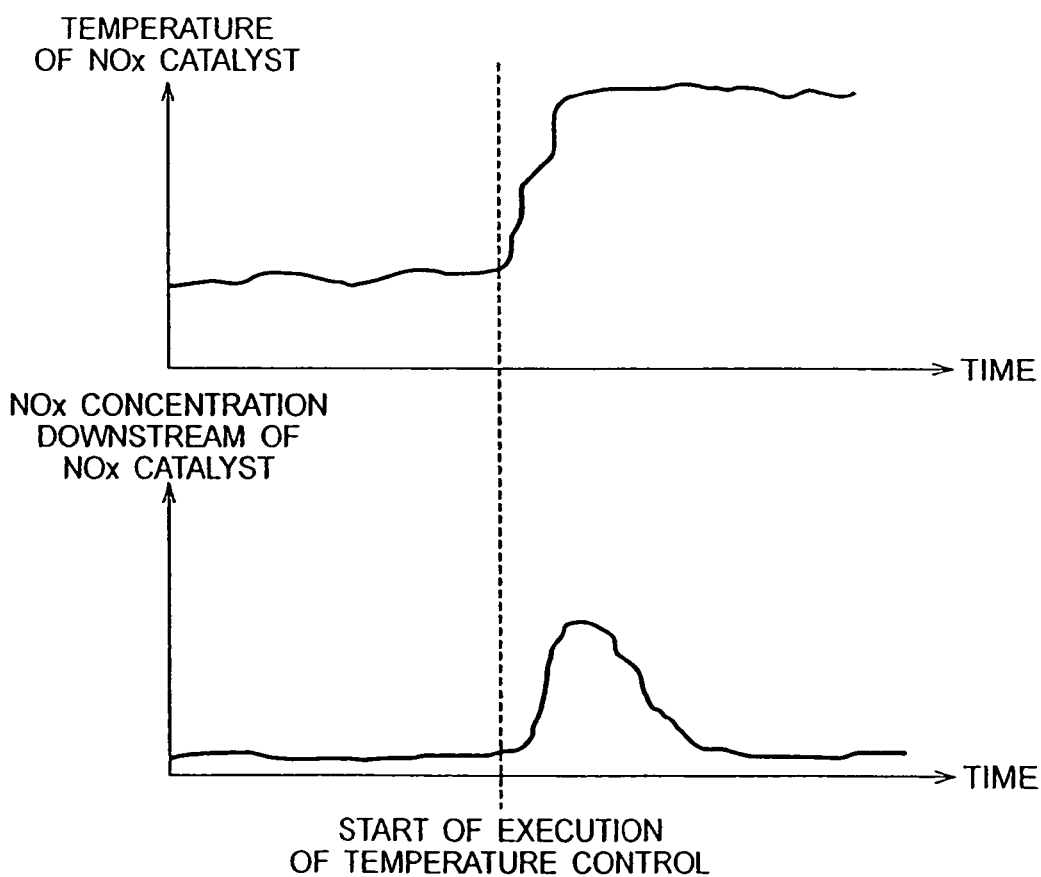
FIG. 4 is a view showing the relation to the NOx concentration of the exhaust at a location downstream of an NOx catalyst and the temperature of the NOx catalyst when temperature raising control is executed.

If NOx are occluded in the NOx catalyst 9 upon execution of the above-mentioned temperature raising control, a part of the NOx occluded in the NOx catalyst 9 may sometimes be discharged therefrom without being reduced, as shown in FIG. 4.

It is considered that this is due to the following reasons. That is, the nitrogen oxides chemically adsorbed by the NOx catalyst 9 among those occluded in the NOx catalyst 9 are thermally decomposed to be discharged from the NOx catalyst 9 by raising the temperature thereof, or the nitrogen oxides physically adsorbed by the NOx catalyst 9 are vaporized to be discharged from the NOx catalyst 9 by raising the temperature thereof, or the oxygen concentration of the exhaust is reduced by adding the reducing agent to the exhaust in the temperature raising control.

Accordingly, in this embodiment, when the temperature raising control execution condition holds, the ECU 19 executes the rich spike control in advance of executing the temperature raising control, whereby the amount of the NOx occluded in the NOx catalyst 9 is decreased.

Preferably, in the rich spike control executed in advance of the execution of the temperature raising control (hereinafter called "before-temperature-rise rich spike control"), the ECU 19 increases the amount of reducing agent (fuel) to be supplied in comparison with the rich spike control at the ordinary time (hereinafter called "ordinary-time rich spike control"), whereby the amount of NOx occlusion in the NOx catalyst 9 is decreased as much as possible.

The following methods are exemplified as a method of implementing the before-temperature-rise rich spike control. That is, sub-injection such as VIGOM injection, PILOT injection, etc., from the fuel injection valves 3 is carried out, or fuel is intermittently added to the exhaust from the reducing agent addition valve 14. In this embodiment, description will be made by referring to a method of intermittently adding fuel to the exhaust from the reducing agent addition valve 14. Here, as shown in FIG. 2, the reducing agent addition valve 14 constitutes, together with the ECU 19, a first reducing agent supplying section 504*a* in the ordinary-time rich spike control, whereas the reducing agent addition valve 14 constitutes, together with the ECU 19, a second reducing agent supplying section 504*b* in the before-temperature-rise rich spike control.

Figure 5:
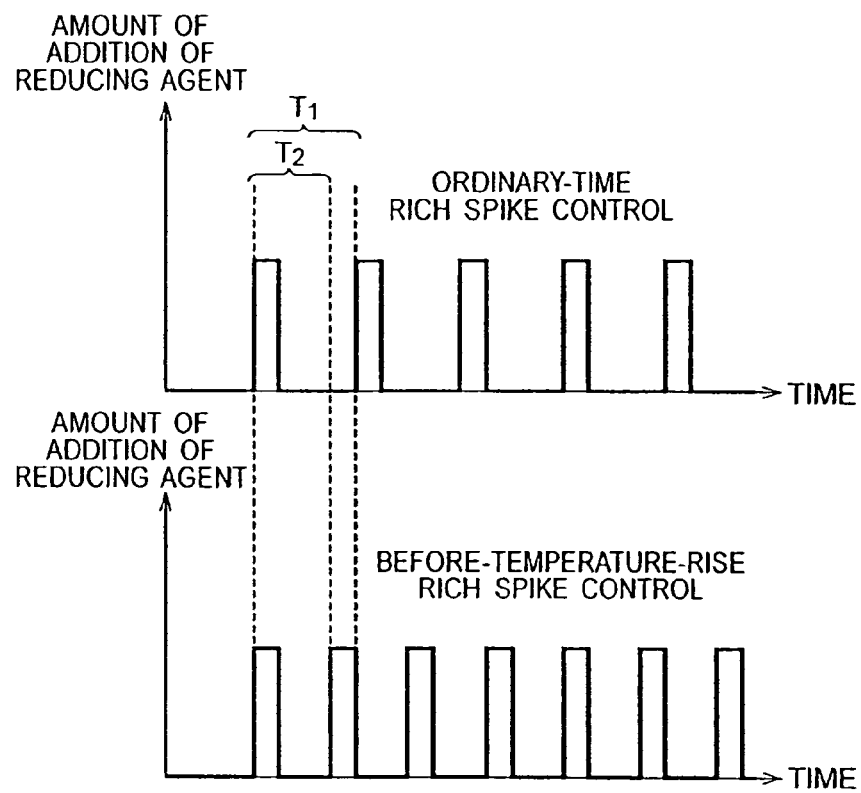
FIG. 5 is a view showing one method of executing before-temperature-rise rich spike control.
Figure 6:
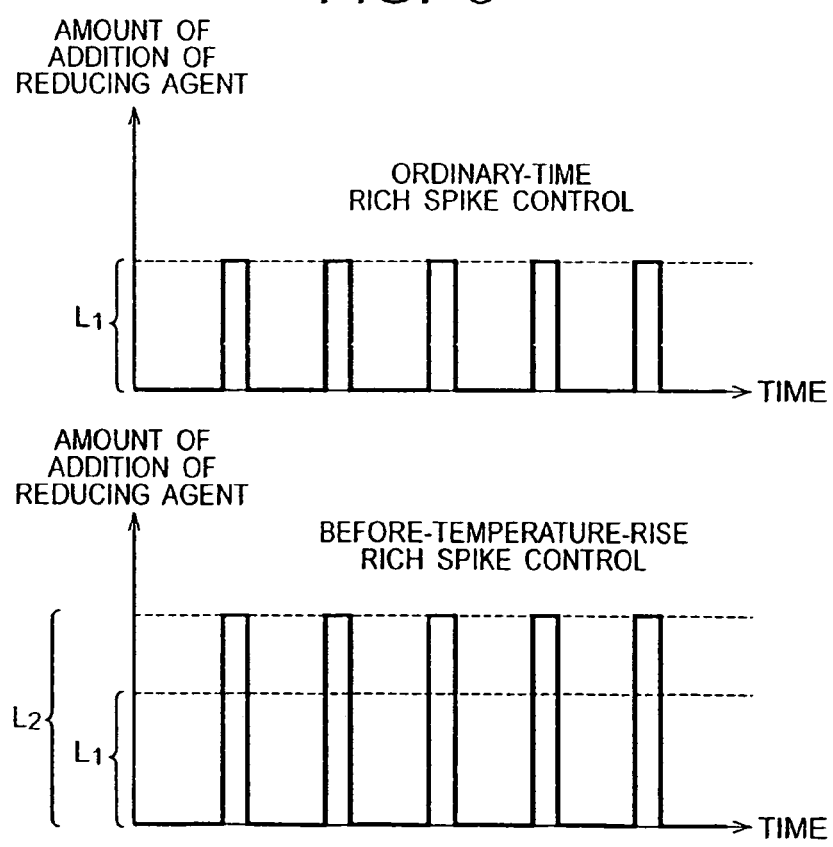
FIG. 6 is a view showing another method of executing before-temperature-rise rich spike control.
Figure 7:
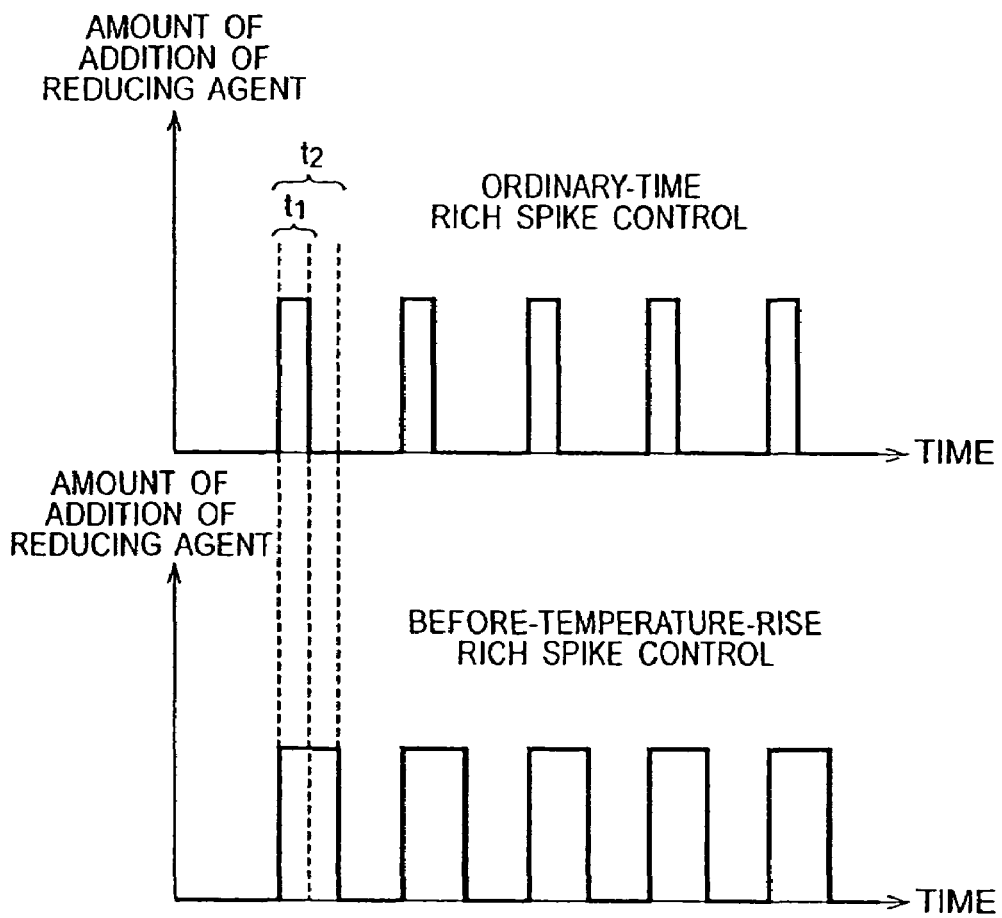
FIG. 7 is a view showing a further method of executing before-temperature-rise rich spike control.

The following methods are exemplified as a method of adding an amount of reducing agent in the before-temperature-rise rich spike control more than that in the ordinary-time rich spike control. That is, (1) a reducing agent addition interval $T_2$ in the before-temperature-rise rich spike control is made shorter than a reducing agent addition interval $T_1$ in the ordinary-time rich spike control (see FIG. 5); or (2) a reducing agent addition amount $L_2$ to be added one time in the before-temperature-rise rich spike control is made more than a reducing agent addition amount $L_1$ to be added one time in the ordinary-time rich spike control (see FIG. 6); or (3) a reducing agent addition time $t_2$, for which the reducing agent is added one time, in the before-temperature-rise rich spike control is made more than a reducing agent addition time $t_1$, for which the reducing agent is added one time, in the ordinary-time rich spike control (see FIG. 7).

Here, note that there is a possibility that if the reducing agent addition amount in the before-temperature-rise rich spike control is made more than the reducing agent addition amount in the ordinary-time rich spike control, the amount of reducing agent may become excessive with respect to the amount of NOx occluded in the NOx catalyst 9. However, a surplus amount of reducing agent, which does not contribute to the reduction and purification of NOx, contributes to raising the temperature of the NOx catalyst 9, and hence the reducing agent in the form of fuel is not discharged into the atmosphere as it is.

Next, there are the following methods exemplified as a method of determining the reducing agent addition amount in the before-temperature-rise rich spike control. That is, a predetermined amount of reducing agent is added to the reducing agent addition amount in the ordinary-time rich spike control, or an amount of reducing agent is added to the reducing agent addition amount in the ordinary-time rich spike control in accordance with the amount of NOx occluded in the NOx catalyst 9.

Figure 8:
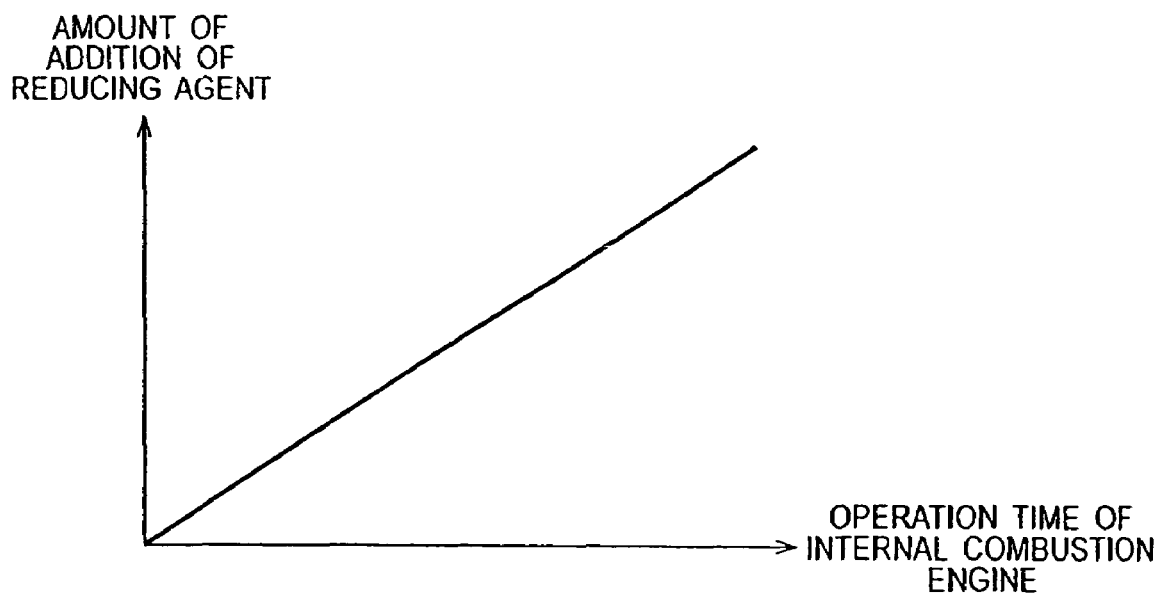
FIG. 8 is a view showing the relation between the amount of the reducing agent added to the reducing agent addition amount in the ordinary-time rich spike control and the operation time of the internal combustion engine.
Figure 9:
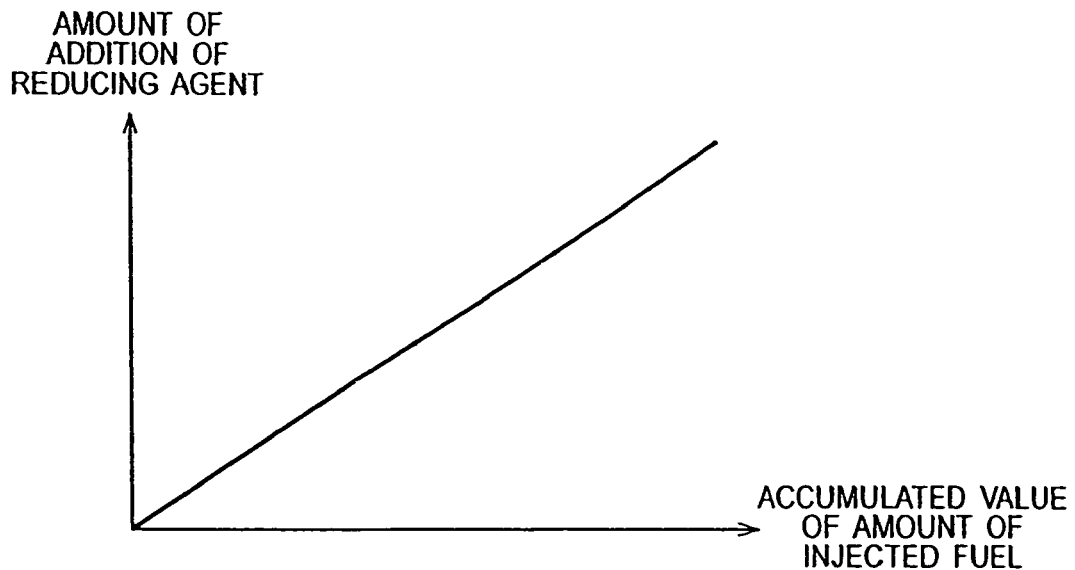
FIG. 9 is a view showing the relation between the amount of the reducing agent added to the reducing agent addition amount in the ordinary-time rich spike control and the integrated value of the amount of fuel injected of the internal combustion engine.
Figure 10:
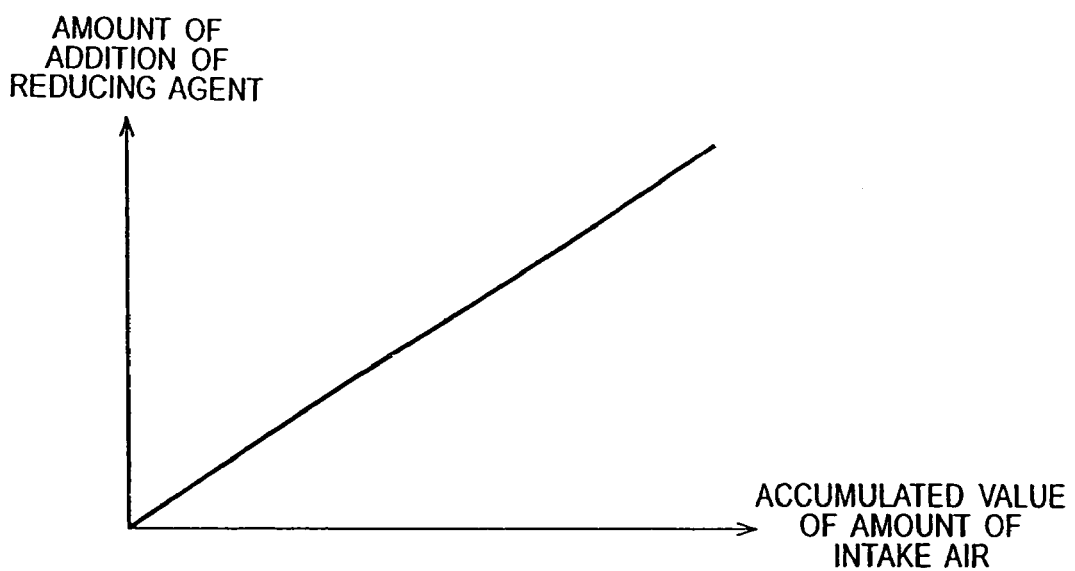
FIG. 10 is a view showing the relation between the amount of the reducing agent added to the reducing agent addition amount in the ordinary-time rich spike control and the integrated value of the amount of intake air of the internal combustion engine.

Also, there are the following methods exemplified as a method of deciding an amount of addition of the reducing agent when an amount of reducing agent is added to the reducing agent addition amount in the ordinary-time rich spike control in accordance with the amount of NOx occluded in the NOx catalyst 9. That is, (1) the amount of addition is increased in accordance with the increasing operation time of the internal combustion engine 1 from the end of execution of the last rich spike control (see FIG. 8); or (2) the amount of addition is increased in accordance with the increasing integrated or accumulated value of the amount of injected fuel from the end of execution of the last rich spike control (see FIG. 9); or (3) the amount of addition is increased in accordance with the increasing integrated or accumulated value of the amount of intake air supplied to the engine from the end of execution of the last rich spike control (see FIG. 10).

Here, note that in case where the amount of NOx occluded in the NOx catalyst 9 is relatively small when the temperature raising control execution condition holds, for example, where the amount of NOx occluded in the NOx catalyst 9 when the temperature raising control execution condition holds is lower than a regulated value of the NOx emission required of the internal combustion engine 1, the rich spike control is prevented from being executed, as a result of which it is possible to harmonize the prevention of deterioration in the exhaust emissions and the reduction of fuel consumption with each other.

When the before-temperature-rise rich spike control is executed as described above, the amount of NOx occluded in the NOx catalyst 9 at the start of the temperature raising control decreases, so that the amount of NOx inadvertently discharged from the NOx catalyst 9 when the temperature of the NOx catalyst 9 is raised under the temperature raising control is decreased. Accordingly, the deterioration of the exhaust emissions can be suppressed at the time of executing the temperature raising control.

Hereinafter, the temperature raising control in this embodiment will be explained while referring to FIG. 11.

Figure 11:
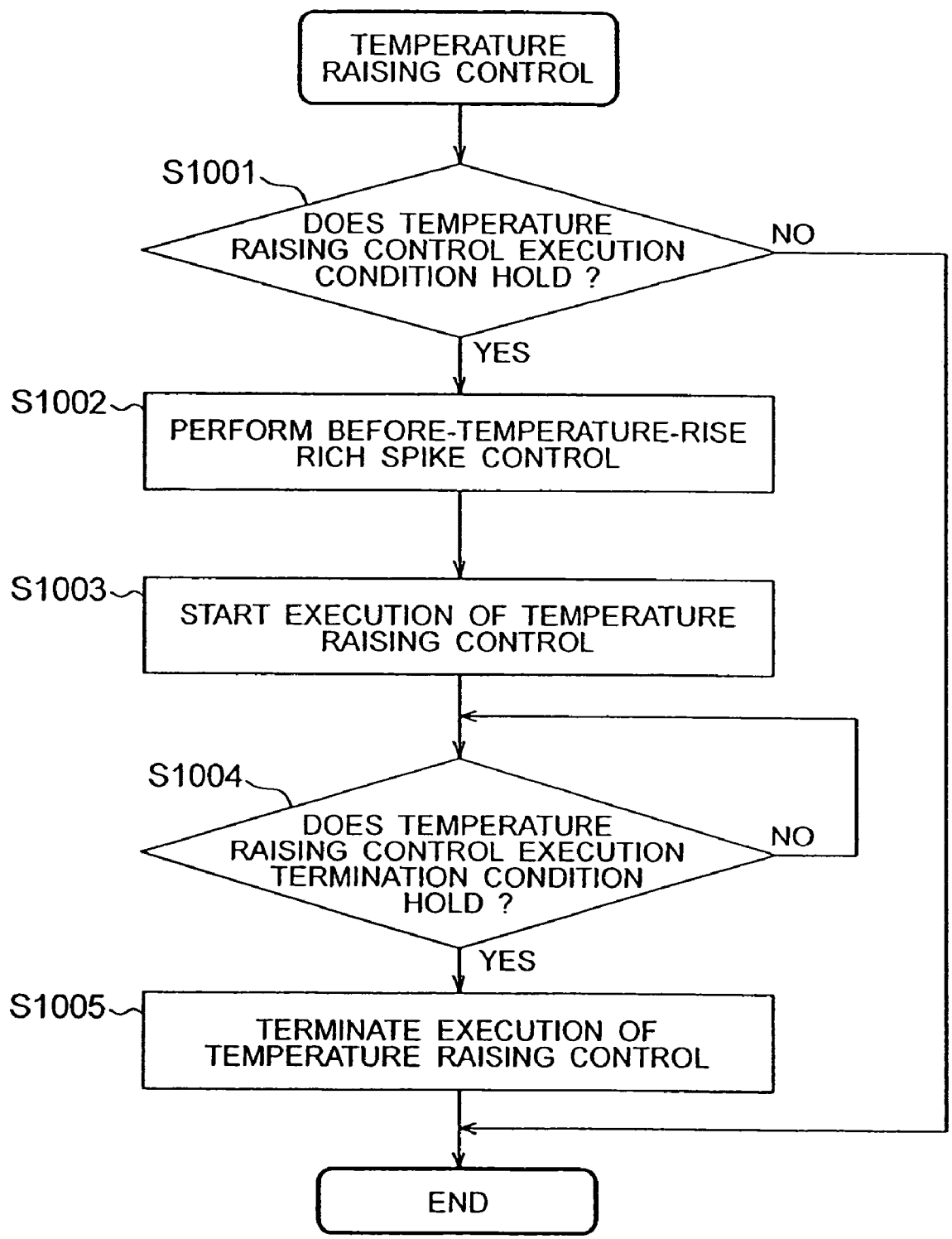
FIG. 11 is a flow chart showing a temperature raising control routine according to an embodiment of the present invention.

FIG. 11 is a flow chart showing a temperature raising control routine which is stored in advance in the ROM of the ECU19. This temperature raising control routine is executed by the ECU 19 as interrupt processing with the elapse of a predetermined time, the input of a pulse signal from the crank position sensor 17 or the like being made as a trigger.

In the temperature raising control routine, first in step S1001, the ECU 19 determines whether the temperature raising control execution condition holds. That is, the ECU 19 determines whether the amount of sulfur oxides (SOx) occluded in the NOx occlusive agent, which constitutes the NOx catalyst 9, is more than or equal to a predetermined amount; or whether the amount of particulate matter (PM) collected in the particulate filter, which constitutes the NOx catalyst 9, is more than or equal to a predetermined amount.

When the amount of sulfur oxides (SOx) occluded in the NOx occlusive agent constituting the NOx catalyst 9 is less than the predetermined amount, and also the amount of particulate matter (PM) collected in the particulate filter constituting the NOx catalyst 9 is less than the predetermined amount, the ECU 19 determines that the temperature raising control execution condition does not hold, and terminates the execution of this routine.

On the other hand, when the amount of sulfur oxides (SOx) occluded in the NOx occlusive agent constituting the NOx catalyst 9 is more than or equal to the predetermined amount, or when the amount of particulate matter (PM) collected in the particulate filter constituting the NOx catalyst 9 is more than or equal to the predetermined amount, the ECU 19 determines that the temperature raising control execution condition holds, and the control flow advances to step S1002.

In step S1002, the ECU 19 executes the before-temperature-rise rich spike control as stated above. Here, note that the processing in step S1002 corresponds to a nitrogen oxides reducing step in this embodiment.

In step S1003, the ECU 19 starts executing the temperature raising control.

In step S1004, the ECU 19 determines whether a temperature raising control execution termination condition holds.

For example, the following conditions are exemplified as the temperature raising control execution termination condition. That is, (1) the time elapsed from the start of execution of the temperature raising control is longer than or equal to a predetermined time; and (2) the amount of particulate matter (PM) collected in the particulate filter constituting the NOx catalyst 9 is less than a predetermined amount.

When it is determined in step S1004 that the temperature raising control execution termination condition does not hold, the ECU 19 repeatedly executes the process in the step S1004 until the temperature raising control execution termination condition holds.

When it is determined in step S1004 that the temperature raising control execution termination condition holds, the control flow of the ECU 19 advances to step S1005, and terminates the execution of the temperature raising control.

Here, note that the processes from step S1003 to step S1005 correspond to a temperature raising step in this embodiment.

The ECU 19 executes the temperature raising control routine in this manner, so that the amount of NOx occluded in the NOx catalyst 9 is decreased before the temperature raising control on the NOx catalyst 9 is executed. As a result, when the temperature raising control on the NOx catalyst 9 is executed, the amount of NOx inadvertently discharged from the NOx catalyst 9 is decreased, thereby suppressing the deterioration of the exhaust emissions at the time of executing the temperature raising control.

Figure 12:
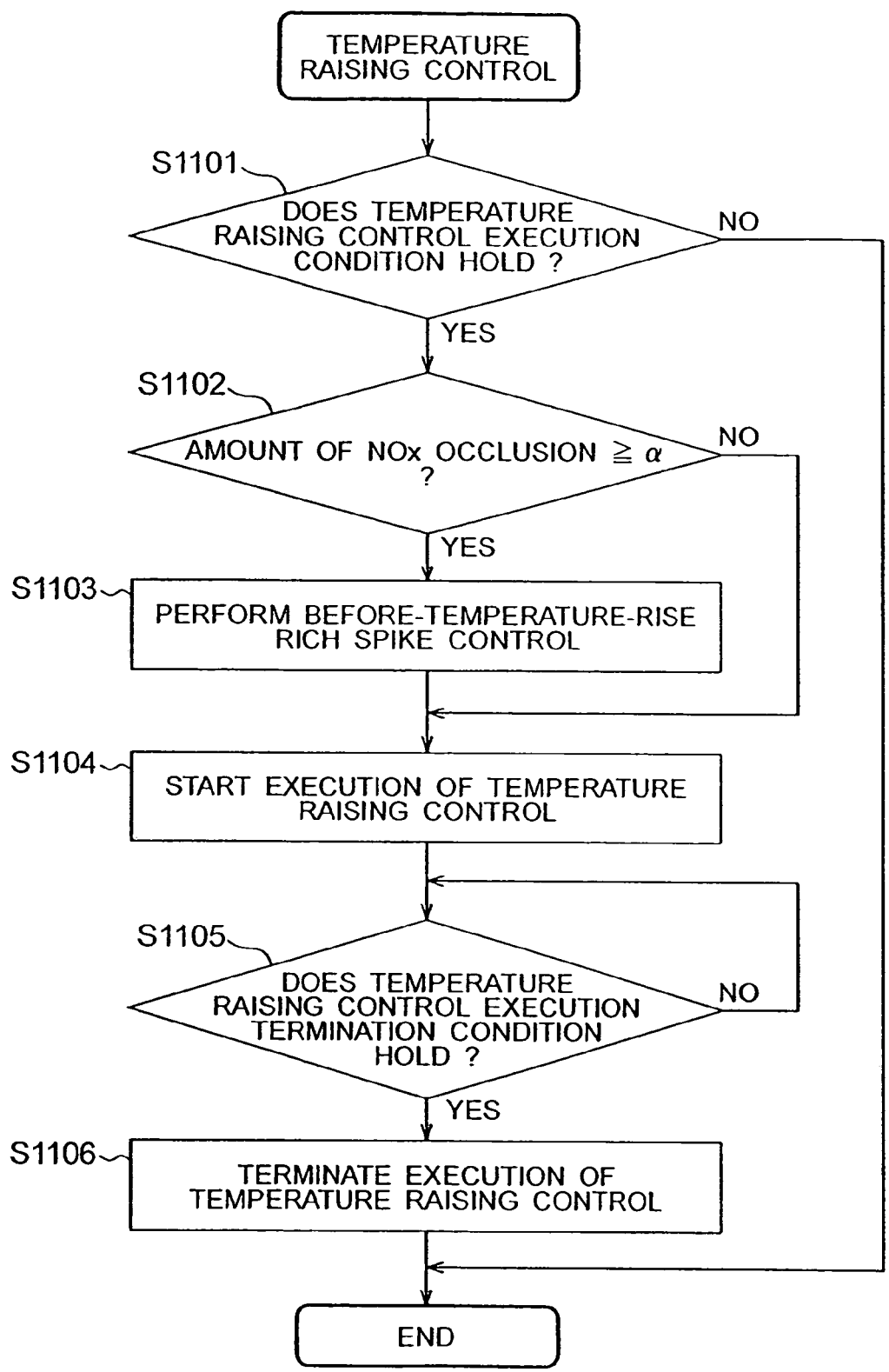
FIG. 12 is a flow chart showing another temperature raising control routine according to another embodiment of the present invention.
Figure 13:
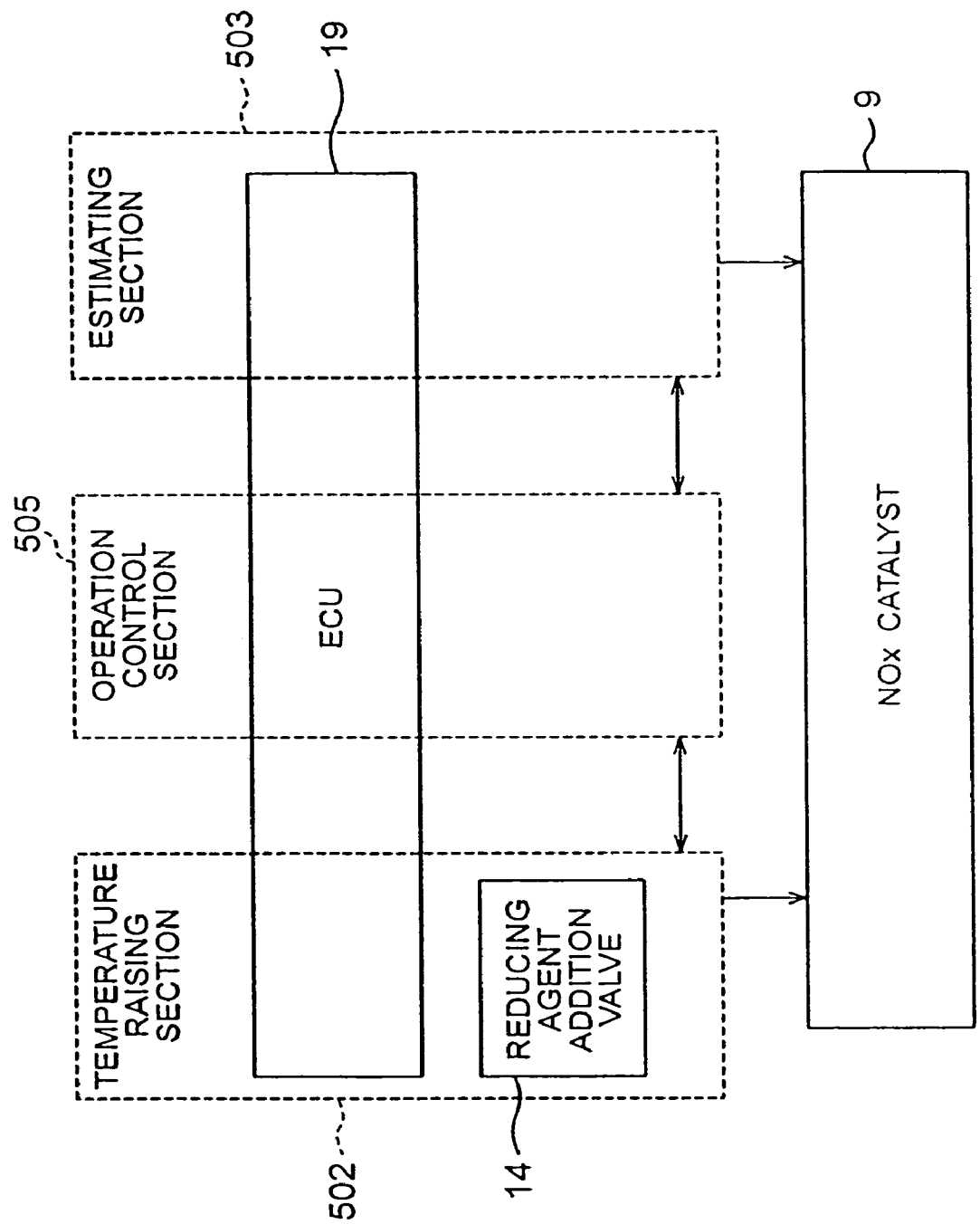
FIG. 13 is a block diagram showing an exhaust emission control apparatus for an internal combustion engine according to another embodiment of the present invention.

In addition, in cases where the before-temperature-rise rich spike control is executed only when the amount of NOx occluded in the NOx catalyst 9 at the time the temperature raising control execution condition holds is more than or equal to the predetermined amount, it is preferred that the ECU 19 execute a temperature raising control routine as shown in FIG. 12. FIG. 13 shows a block diagram of an exhaust emission control apparatus for an internal combustion engine in such a case.

In this case, after it is determined in S1101 that the temperature raising control execution condition holds, the control flow advances to step S1102 where the ECU 19 determines whether the amount of NOx occluded in the NOx catalyst 9 is more than or equal to a predetermined amount $\alpha$.

At this time, the amount of NOx occluded in the NOx catalyst 9 may be estimated by an estimating section 503 shown in FIG. 13 from the operation time of the internal combustion engine 1 from the end of execution of the last rich spike control, or the integrated or accumulated value of the amount of fuel injected from the end of execution of the last rich spike control, or the integrated or accumulated value of the amount of intake air from the end of execution of the last rich spike control. Here, note that the estimating section 503 in this embodiment is constituted by the ECU 19. Also, in this case, the processing in step S1102 includes an estimating step in this embodiment.

When it is determined in step S1102 that the amount of NOx occluded in the NOx catalyst 9 is more than or equal to the predetermined amount $\alpha$, the ECU 19 executes the before-temperature-rise rich spike control in step S1103, and thereafter further executes the temperature raising control in step S1104 and the following steps. On the other hand, when it is determined in step S1102 that the amount of NOx occluded in the NOx catalyst 9 is less than the predetermined amount $\alpha$, the ECU 19 executes the temperature raising control in step S1104 and the following steps while skipping the step S1103. Here, note that the process in step S1103 corresponds to a nitrogen oxides reducing step in this embodiment, and the processes from step S1104 to step S1106 correspond to a temperature raising step in this embodiment.

Furthermore, the control flow may be carried out as follows. That is, it is determined again that the amount of NOx occluded the NOx catalyst 9 is more than or equal to the predetermined amount $\alpha$ after execution of the before-temperature-rise rich spike control in step S1103. Only when the amount of NOx occluded in the NOx catalyst 9 is less than the predetermined amount $\alpha$, the temperature raising control in step S1104 and the following steps is executed, whereas when the amount of NOx occluded in the NOx catalyst 9 is more than or equal to the predetermined amount $\alpha$, the before-temperature-rise rich spike control in step S1103 is performed continuously.

In other words, the operation of the temperature raising section 502 may be permitted by means of an operation control section 505 on the condition that the amount of nitrogen oxides estimated by the estimating section 503 is less than the predetermined value. Here, note that the operation control section 505 in this embodiment is constituted by the ECU 19.

Thus, if the before-temperature-rise rich spike control is executed only when the amount of NOx occluded in the NOx catalyst 9 at the time the temperature raising control execution condition holds is more than or equal to the predetermined amount, the execution of the temperature raising control is permitted when the amount of NOx occluded in the NOx catalyst 9 is less than the predetermined amount, whereas when the amount of NOx occluded in the NOx catalyst 9 is more than or equal to the predetermined amount, the execution of the temperature raising control is not permitted as long as the before-temperature-rise rich spike control is not executed.

Accordingly, an increase in the fuel consumption due to the before-temperature-rise rich spike control can be avoided while suppressing deterioration in the exhaust emissions at the time of executing the temperature raising control. As a result, it is possible to harmonize the prevention of deterioration in the exhaust emissions and the suppression of the increase in the fuel consumption with each other.

Although in the above-mentioned embodiments, description has been made to an exemplary case in which the present invention is applied to an internal combustion engine of compression ignition type (diesel engine), the present invention is also applicable to an internal combustion engine of spark ignition type (gasoline engine), and in this case, the fuel injection valves 3 may inject fuel directly into the cylinders 2, or they may inject fuel into the intake passage 7.

As can be seen from the foregoing description, according to the present invention, in an exhaust emission control apparatus having an NOx catalyst disposed on an exhaust passage of an internal combustion engine, the amount of nitrogen oxides discharged from the NOx catalyst when the temperature of the NOx catalyst is raised can be decreased, thereby making it possible to suppress the deterioration of the exhaust emissions upon raising the temperature of the NOx catalyst.

While the invention has been described in terms of preferred embodiments, those skilled in the art will recognize that the invention can be practiced with modifications within the spirit and scope of the appended claims.

What is claimed is:

1. An exhaust emission control apparatus for an internal combustion engine, comprising:
   an NOx catalyst disposed in an exhaust passage of said internal combustion engine;
   a temperature raising section for raising the temperature of said NOx catalyst;
   a nitrogen oxides reducing section for reducing an amount of nitrogen oxides occluded in said NOx catalyst, before said temperature raising section is operated to raise the temperature of said NOx catalyst, more than when the temperature of the NOx catalyst is not raised; and
   a particulate filter for collecting particulate matter in an exhaust,
   wherein said temperature raising section raises the temperature of said NOx catalyst when said particulate matter collected by said particulate filter is removed.

2. The exhaust emission control apparatus for an internal combustion engine as set forth in claim 1, wherein said nitrogen oxides reducing section comprises a reducing agent supplying section for supplying a reducing agent to said NOx catalyst.

3. The exhaust emission control apparatus for an internal combustion engine as set forth in claim 2, wherein said reducing agent supplying section supplies said reducing agent to said NOx catalyst by performing the sub-injection of fuel on at least one of an intake stroke, an expansion stroke and an exhaust stroke of said internal combustion engine.

4. The exhaust emission control apparatus for an internal combustion engine as set forth in claim 2, wherein said reducing agent supplying section supplies said reducing agent to said NOx catalyst by adding said reducing agent to the exhaust from a reducing agent addition valve disposed on said exhaust passage of said internal combustion engine.

5. The exhaust emission control apparatus for an internal combustion engine as set forth in claim 1, further comprising an estimating section for estimating the amount of nitrogen oxides occluded in said NOx catalyst,
   wherein when the amount of nitrogen oxides estimated by said estimating section is less than a predetermined amount, said nitrogen oxides reducing section does not reduce the amount of said nitrogen oxides occluded in said NOx catalyst.

6. The exhaust emission control apparatus for an internal combustion engine as set forth in claim 1, wherein said NOx catalyst comprises:
   an NOx occlusive agent being operable to occlude said nitrogen oxides in the exhaust when the air fuel ratio of the exhaust flowing into the NOx catalyst is lean, and discharge the occluded nitrogen oxides when the oxygen concentration of the exhaust flowing into the NOx catalyst is reduced.

7. An exhaust emission control apparatus for an internal combustion engine comprising:
   an NOx catalyst disposed in an exhaust passage of said internal combustion engine;
   a temperature raising section for raising the temperature of said NOx catalyst;
   a first reducing agent supplying section for supplying a reducing agent to said NOx catalyst when an amount of nitrogen oxides occluded in said NOx catalyst becomes more than or equal to a predetermined amount;
   a second reducing agent supplying section for supplying an amount of said reducing agent more than that supplied by said first reducing agent supplying section to said NOx catalyst before said temperature raising section is operated to raise the temperature of said NOx catalyst; and
   a particulate filter for collecting particulate matter in an exhaust,
   wherein said temperature raising section raises the temperature of said NOx catalyst when said particulate matter collected by said particulate filter is removed.

8. The exhaust emission control apparatus for an internal combustion engine as set forth in claim 7, wherein said second reducing agent supplying section increases the amount of reducing agent to be supplied in accordance with the increasing amount of nitrogen oxides occluded in said NOx catalyst.

9. The exhaust emission control apparatus for an internal combustion engine as set forth in claim 7, wherein said NOx catalyst comprises:
   an NOx occlusive agent being operable to occlude said nitrogen oxides in the exhaust when the air fuel ratio of the exhaust flowing into the NOx catalyst is lean, and discharge the occluded nitrogen oxides when the oxygen concentration of the exhaust flowing into the NOx catalyst is reduced.

10. An exhaust emission control apparatus for an internal combustion engine comprising:

an NOx catalyst disposed in an exhaust passage of said internal combustion engine;

a temperature raising section for raising the temperature of said NOx catalyst;

an estimating section for estimating an amount of nitrogen oxides occluded in said NOx catalyst;

an operation control section adapted to permit an operation of said temperature raising section when the amount of nitrogen oxides estimated by said estimating section is less than a predetermined amount; and a particulate filter for collecting particulate matter in an exhaust, wherein said temperature raising section raises the temperature of said NOx catalyst when said particulate matter collected by said particulate filter is removed.

11. The exhaust emission control apparatus for an internal combustion engine as set forth in claim 10, wherein said NOx catalyst comprises:

an NOx occlusive agent being operable to occlude said nitrogen oxides in an exhaust when the air fuel ratio of the exhaust flowing into the NOx catalyst is lean, and discharge the occluded nitrogen oxides when the oxygen concentration of the exhaust flowing into the NOx catalyst is reduced.

12. An exhaust emission control method for an internal combustion engine, comprising:

a particulate matter removing step for removed particulate matter in an exhaust collected by a particulate filter;

a temperature raising step for raising the temperature of an NOx catalyst disposed in an exhaust passage of said internal combustion engine when said particulate matter collected by said particulate filter is removed; and an nitrogen oxides reducing step for reducing an amount of nitrogen oxides occluded in said NOx catalyst before said temperature raising step by an amount more than when the temperature of the NOx catalyst is not raised.

13. The exhaust emission control method for an internal combustion engine as set forth in claim 12, wherein in said nitrogen oxides reducing step, the amount of nitrogen oxides occluded in said NOx catalyst is reduced by supplying a reducing agent to said NOx catalyst.

14. The exhaust emission control method for an internal combustion engine as set forth in claim 12, further comprising an estimating step for estimating the amount of nitrogen oxides occluded in said NOx catalyst before said nitrogen oxides reducing step, wherein said nitrogen oxides reducing step is not performed when the amount of nitrogen oxides estimated in said estimating step is less than a predetermined amount.

15. An exhaust emission control method for an internal combustion engine, comprising:

a particulate matter removing step for removing particulate matter in an exhaust collected by a particulate filter;

a temperature raising step for raising the temperature of an NOx catalyst disposed in an exhaust passage of said internal combustion engine when said particular matter collected by said particulate filter is removed; and a nitrogen oxides reducing step for reducing an amount of nitrogen oxides occluded in said NOx catalyst by supplying a reducing agent to said NOx catalyst when the amount of nitrogen oxides occluded in said NOx catalyst becomes more than or equal to a predetermined amount, wherein an amount of reducing agent supplied to said NOx catalyst is increased in said nitrogen oxides reducing step before said temperature raising step.

16. The exhaust emission control method for an internal combustion engine as set forth in claim 15, wherein the amount of reducing agent is increased in accordance with the increasing amount of said nitrogen oxides occluded in said NOx catalyst in said nitrogen oxides reducing step before said temperature raising step.

17. An exhaust emission control method for an internal combustion engine comprising:

a particulate matter removing step for reducing particulate matter in an exhaust collected by a particulate filter;

an estimating step for estimating an amount of nitrogen oxides occluded in an NOx catalyst disposed in an exhaust passage of said internal combustion engine; and a temperature raising step for raising the temperature of said NOx catalyst on the condition that the amount of nitrogen oxides estimated in said estimating step is less than a predetermined amount, when said particulate matter collected by said particulate filter is removed.

* * * * *

UNITED STATES PATENT AND TRADEMARK OFFICE
CERTIFICATE OF CORRECTION

PATENT NO.        : 7,111,456 B2                                    Page 1 of 1
APPLICATION NO.   : 10/724154
DATED             : September 26, 2006
INVENTOR(S)       : Kohei Yoshida and Shinichi Takeshima It is certified that error appears in the above-identified patent and that said Letters Patent is hereby corrected as shown below:

On the Title page (75) (Inventors): change "Sosono" to --Susono--.

Signed and Sealed this

Twenty-sixth Day of December, 2006

JON W. DUDAS
*Director of the United States Patent and Trademark Office*